UNITED STATES PATENT OFFICE.

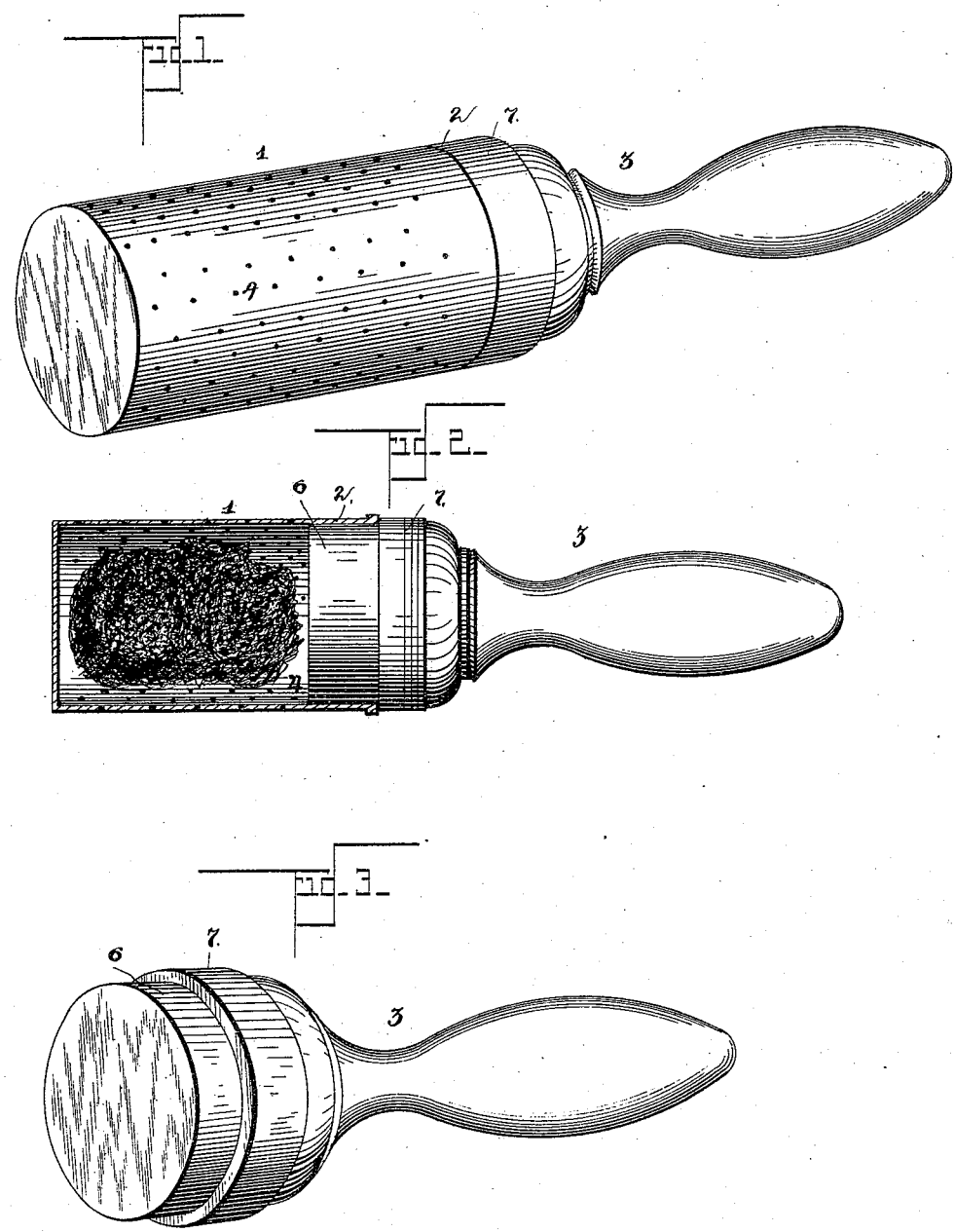

JOHN RANDOLF ELLIOTT, OF CLINTON, MISSOURI.

HAND-SPRINKLER.

SPECIFICATION forming part of Letters Patent No. 429,609, dated June 10, 1890.

Application filed February 26, 1890. Serial No. 341,781. (No model.)

*To all whom it may concern:*

Be it known that I, JOHN RANDOLF ELLIOTT, a citizen of the United States, residing at Clinton, in the county of Henry and State of Missouri, have invented a new and useful Hand-Sprinkler, of which the following is a specification.

The invention relates to improvements in hand-sprinklers.

The object of the present invention is to provide a simple and inexpensive hand-sprinkler adapted to contain a considerable amount of water, and capable of being quickly refilled after its contents have been used.

The invention consists in the construction and novel combination and arrangement of parts hereinafter fully described, illustrated in the accompanying drawings, and pointed out in the claim hereto appended.

In the drawings, Figure 1 is a perspective view of a hand-sprinkler constructed in accordance with this invention. Fig. 2 is a longitudinal sectional view. Fig. 3 is a detail view of the handle.

Referring to the accompanying drawings, 1 designates a vessel which forms the body of the sprinkler and is adapted to contain the water, and is preferably cylindrical in shape, and has one end 2 closed by a handle 3. The cylindrical vessel 1 has its sides 4 perforated, and contains a sponge or other absorbent material that is adapted to soak and retain the water and prevent it escaping through the perforations until forced therethrough by the hand of the operator in quickly moving the sprinkler. The handle 3 is adapted to enter the open end of the cylindrical vessel 1 and close the same and prevent the escape of water, and it may be quickly inserted in the vessel and removed therefrom, and it is provided with an integral disk or plug 6, that forms a cover or stopper for the vessel, and the said disk is provided with a circumferential shoulder 7, that abuts against the end of the vessel and prevents the disk or plug 6 entering too far. It will readily be seen that the sprinkler is adapted to be readily operated by the hand, and is simple and inexpensive in construction, and it may be quickly supplied with water from time to time without inconveniencing the operator.

Having thus described my invention, what I claim is—

A hand-sprinkler comprising the cylindrical vessel having one end open and provided with perforations in its sides, the sponge or absorbent material arranged within the vessel, and the removable handle provided with a disk or plug fitting in the open end of the vessel and serving as a stopper or cover, substantially as described.

In testimony that I claim the foregoing as my own I have hereto affixed my signature in presence of two witnesses.

JOHN RANDOLF ELLIOTT.

Witnesses:
WILLIAM F. CARTER,
WM. H. SAMSON.